United States Patent [19]
Togo et al.

[11] Patent Number: 5,410,689
[45] Date of Patent: Apr. 25, 1995

[54] SYSTEM FOR MERGE SORTING THAT ASSIGNS AN OPTICAL MEMORY CAPACITY TO CONCURRENT SORT CELLS

[75] Inventors: Kazuo Togo; Masahiro Hiruma; Susuma Matsuda, all of Tokyo, Japan

[73] Assignee: Kabushiki Kaisha Toshiba, Kawasaki, Japan

[21] Appl. No.: 897,779

[22] Filed: Jun. 12, 1992

[30] Foreign Application Priority Data

Jun. 13, 1991 [JP] Japan .................................. 3-141746
Jun. 13, 1991 [JP] Japan .................................. 3-141747

[51] Int. Cl.6 .......................................... G06F 15/40
[52] U.S. Cl. .................................. 395/600; 395/800; 364/DIG. 1; 364/222.9; 364/282.1
[58] Field of Search .............................. 395/600, 800; 364/146.2

[56] References Cited

U.S. PATENT DOCUMENTS

| 4,799,152 | 1/1989 | Chuang et al. | 340/146.2 |
| 4,991,134 | 2/1991 | Ivsin | 395/800 |
| 5,185,888 | 2/1993 | Tanaka et al. | 395/600 |
| 5,210,870 | 5/1993 | Baum et al. | 395/600 |
| 5,274,835 | 12/1993 | Wakatani | 395/800 |

OTHER PUBLICATIONS

Horowitz et al., Fundamentals of Data Structures in Pascal, pp. 382–385, Computer Science Press, 1987.

Primary Examiner—Thomas G. Black
Assistant Examiner—Wayne Amsbury
Attorney, Agent, or Firm—Cushman Darby & Cushman

[57] ABSTRACT

According to this invention, an address converter for defining a start address of an external memory for each of sort controllers is arranged to each of sort cells or is commonly arranged to the sort cells. An optimal memory capacity for each of the sort controllers is assigned to the external memory. The plurality of sort controllers commonly use one memory bus, and use timings of the common memory bus are sequentially controlled between the plurality of sort controllers. The external memory can be commonly used as a buffer memory, and use efficiency of the memory can be increased. In addition, since the single memory bus is used, the number of input/output pins for the memory bus is decreased, and the plurality of sort controllers can be integrated on one chip without increasing the number of input/output pins.

10 Claims, 7 Drawing Sheets

SYSTEM FOR MERGE SORTING THAT ASSIGNS AN OPTICAL MEMORY CAPACITY TO CONCURRENT SORT CELLS

BACKGROUND OF THE INVENTION

1. Field of the Invention

The present invention relates to a sort processing apparatus and, more particularly, to a sort processing apparatus having a pipeline arrangement for performing merge sort of two sets of input data in accordance with a two-way merge sort algorithm.

2. Description of the Related Art

Figure 1:
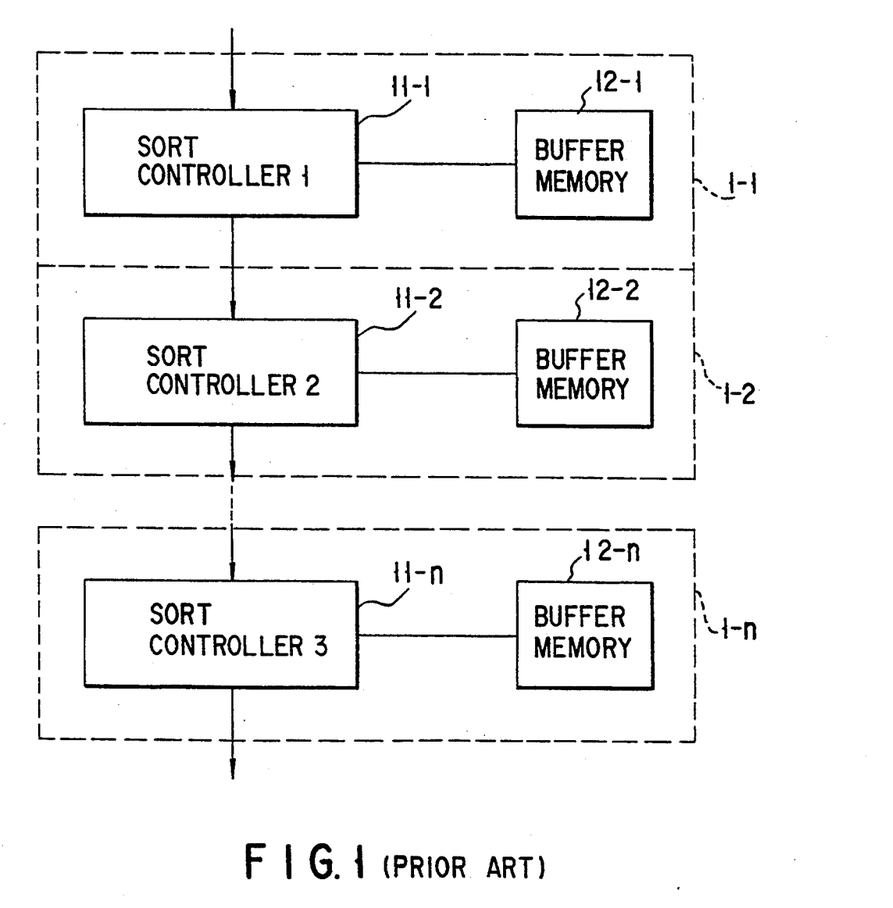
FIG. 1 is a block diagram showing an arrangement of a conventional sort processing apparatus.

In a conventional sort processing apparatus for performing sort processing in accordance with a two-way merge sort algorithm, a hardware arithmetic circuit having an arrangement shown in FIG. 1 is used to realize a high speed operation of the sort processing. That is, an apparatus shown in FIG. 1 is arranged such that sort cells 1-1, 1-2 .... 1-n are connected to each other in series, and each of the sort cells 1-1, 1-2, ... 1-n outputs a data row aligned by performing merge sort of two sets of input data.

Each of the sort cells 1-1, 1-2, ... 1-n consists of a buffer memory for temporarily storing input data and a sort controller for sorting the data stored in the buffer memory. That is, the first sort cell 1-1 consists of a sort controller 11-1 and a buffer memory 12-1, the second sort cell 1-2 consists of a sort controller 11-2 and a buffer memory 12-2, and the nth sort cell 1-n consists of a sort controller 11-n and a buffer memory 12-n. Each of the sort controllers has a control circuit and directly inputs a memory address to a corresponding buffer memory to access it.

At this time, according to the nature of the two-way merge sort algorithm, the first sort cell 1-1 requires a buffer memory capacity twice a data length to be sorted (e.g., a record length), the second sort cell 1-2 requires a buffer memory capacity four times the data length, and the nth sort cell 1-n requires a buffer memory capacity $2^n$ times the data length.

In the two-way merge sort, the first sort cell 1-1 sequentially stores data in the buffer memory 12-1 in units of two data from the start data of input data rows to sort each of sets of data, the second sort cell 1-2 stores the data rows sorted by the first sort cell 1-1 in the buffer memory 12-2 in units of two sets of rows to sort two sets of data rows (four data), and the third sort cell stores the data rows sorted by the second sort cell 1-2 in buffer memories in units of two sets of rows to sort two sets of data rows (eight data).

In the sort processing apparatus, for performing two-way merge sort, having the pipeline shown in FIG. 1, the buffer memory of the last sort cell requires a large memory capacity, but a small memory capacity is enough for the buffer memory of the first sort cell.

However, in practice, since types of semiconductor memory chips used as a buffer memory are limited, a memory suitable for a memory capacity of each of buffer memories cannot be easily prepared for all the sort cells. For this reason, conventionally, a memory chip having a relatively large memory capacity is arranged for each of all the sort cells. In this case, although there is no problem in the last sort cell, most part of the memory capacity of the memory chip is not used to be wasted in the first sort cell.

In addition, since the sort controllers 11-1 through 11-n access the buffer memories 12-1 through 12-n through different memory buses, respectively, when these sort controllers 11-1 through 11-n are to be formed as a one-chip LSI, a large number of input/output pins are required to independently lead the memory buses from the chip. For this reason, the one-chip LSI cannot be easily realized.

SUMMARY OF THE INVENTION

It is an object of the present invention to provide a sort processing apparatus in which a single memory can be divided to be commonly used for a plurality of sort cells, such that use efficiency of the memory can be sufficiently increased.

It is another object of the present invention to provide a sort processing apparatus which has an arrangement suitable for increasing use efficiency of a memory and is formed in a one-chip LSI.

According to the first aspect of the present invention, there is provided a sort processing apparatus in which $2^n$ data can be simultaneously processed by series-connecting n sort cells for performing merge sort of two sets of input data, and each of the sort cells has a buffer memory for temporarily storing input data, a sort executing unit executing sort of data stored in the buffer memory, and a memory bus for connecting the sort executing unit and the buffer memory, comprising an external memory used as a common buffer memory by the plurality of sort cells, and address assigning means for dividing an address space of the external memory and assigning a memory capacity corresponding to an ordinal number of each of the plurality of sort cells to the external memory.

According to the second aspect of the present invention, there is provided a sort processing apparatus in which $2^n$ data can be simultaneously processed by series-connecting n sort cells for performing merge sort of two sets of input data, and each of the sort cells has a buffer memory for temporarily storing input data, a sort executing unit executing sort of data stored in the buffer memory, and a memory bus for connecting the sort executing unit and the buffer memory, comprising means for commonly connecting the memory buses of the sort executing units to lead the buses to an external memory, and means for controlling use timings of the common memory buses used by the sort executing unit, wherein the plurality of sort executing units access the external memory through the common memory buses.

In the sort processing apparatus according to the present invention, since address spaces each having a memory capacity corresponding to an ordinal number of each of plurality of sort cells are assigned on a common external memory, buffer memories need not be independently prepared for the sort cells, and use efficiency can be sufficiently increased.

The memory buses of a plurality of sort executing units are commonly connected, and use timings of the common memory bus are controlled between the plurality of sort executing units. For this reason, a single external memory can be used as a buffer memory, and use efficiency of the memory can be increased. In addition, since the memory buses from the sort cells are integrated into one memory bus, the number of input/output pins for the memory bus is decreased, and the plurality of executing units can be easily integrated on one chip.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will be described below.

Figure 2:
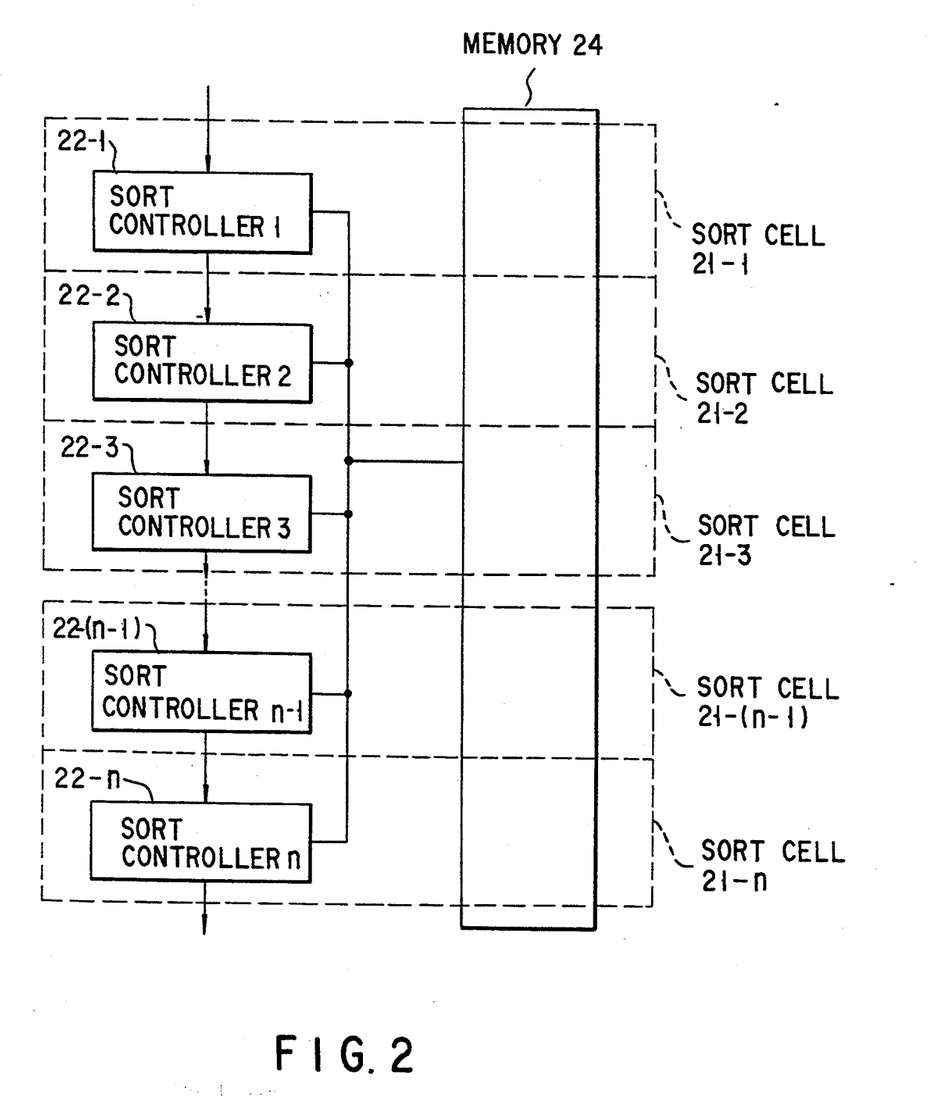
FIG. 2 is a block diagram showing an arrangement of a sort processing apparatus according to an embodiment of the present invention.

FIG. 2 shows a sort processing apparatus according to an embodiment of the present invention. This sort processing apparatus performs sort processing in a pipeline method and consists of series-connected sort cells 21-1 through 21-n. The sort cells 21-1 through 21-n have sort controllers 22-1 through 22-n, respectively. These sort controllers 22-1 through 22-n perform sort processing according to a two-way merge sort algorithm and control all the sort cells.

The sort controllers 22-1 through 22-n are connected to a memory 24 through an address converter 23. The memory 24 is commonly used by the sort controllers 22-1 through 22-n as a buffer memory for storing input data.

The address converter 23 is used to assign address spaces each having a memory capacity corresponding to an ordinal number of each of the plurality of sort controllers 22-1 through 22-n to the external memory 24. The address converter 23 consists of an AND gate and a NOR gate and converts memory addresses issued from the sort controllers 22-1 through 22-n.

The conversion of the memory addresses is performed to define start addresses of the external memory 24 for all the sort controllers 22-1 through 22-1. A start address value is added to a memory address value from each of the sort controllers 22-1 through 22-n as a base address.

When data is input to the first sort controller 22-1, the controller 22-1 write-accesses the memory 24 through the address converter 23 to temporarily store the input data in a predetermined address space of the memory 24. When required data are prepared to be sorted (two data are stored), read access to the memory is performed through the address converter 23 to read out the data, and the data are sorted and output to the second sort controller 22-2.

The second sort controller 22-2 performs the same operation as that of the first sort controller 22-1, and two sets of data rows each consisting of two data are received from the sort controller 22-1 and sorted to be output to the third sort controller 22-3. This operation is repeated in every cell to sort all the data.

The memory 24 is accessed from the first, second, ... nth sort controllers 22-1 through 22-n, temporarily stores data from these sort controllers 22-1 through 22-n, and returns the data to the sort controllers when the sort controller requires the data. In this case, the memory area of the memory 24 is divided by the sort controllers 22-1 through 22-n, a memory capacity corresponding to an ordinal number of each of the sort controllers 22-1 through 22-n is assigned to each of the sort controllers 22-1 through 22-n.

Figure 3:
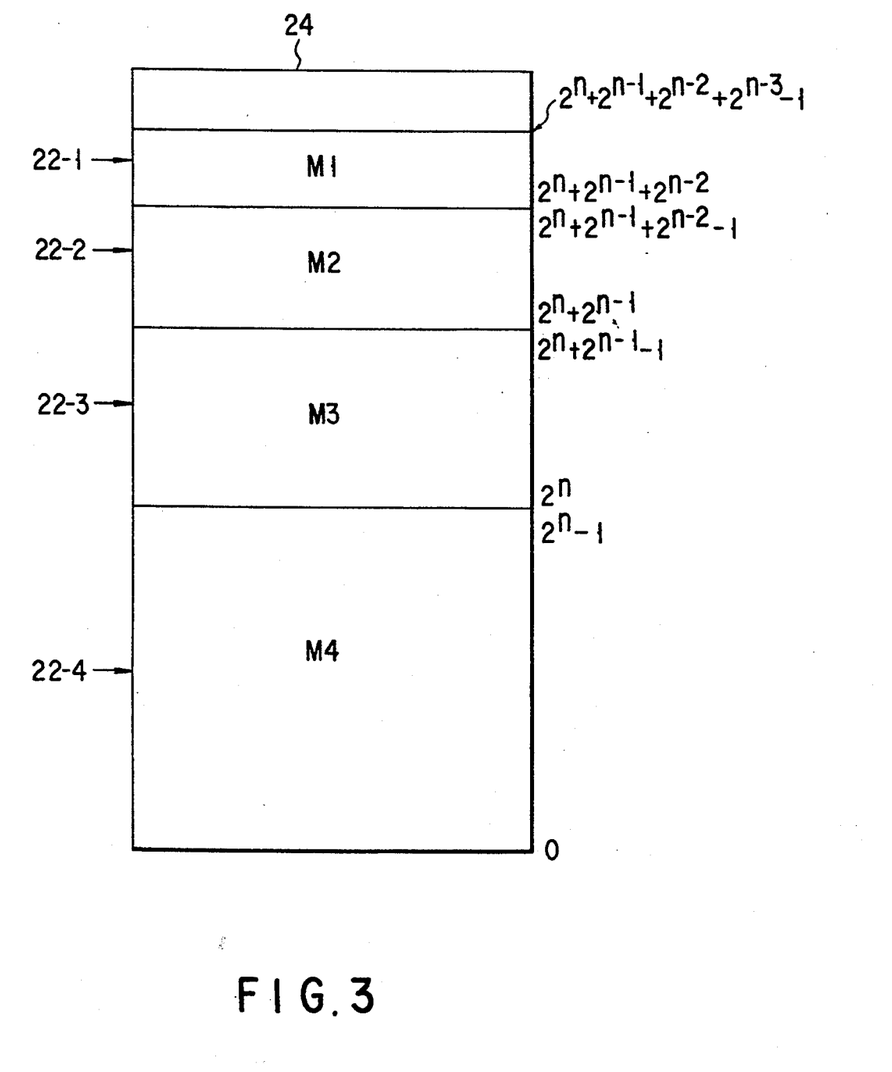
FIG. 3 is a view showing address assignment performed by a memory address converter of the embodiment.

Division of the memory capacity of the memory 24 will be described below with reference to FIG. 3.

At this time, for the sake of descriptive simplicity, a case wherein the memory 24 is divided by the four sort controllers 22-1. through 22-4 will be described. For example, assuming that the last or fourth sort controller 22-4 requires a buffer memory capacity of $2^n$, the third sort controller 22-3 requires a buffer memory capacity of $2^{n-1}$, the second sort controller 22-2 requires a buffer memory capacity of $2^{n-2}$, and the first sort controller 22-1 requires a buffer memory capacitor of $2^{n-3}$. Note that the buffer memory capacity of the last sort controller is determined by, e.g., the number of sort controllers and a record size to be subjected to arithmetic processing.

An address space assigned to the sort controller 22-4 is set to be a space from address $2^n$ to address $2^{n-1}$, an address space assigned to the sort controller 22-3 is set to be a space from address $2^n$ to address $2^n+2^{n-1}-1$, an address space assigned to the sort controller 22-2 is set to be a space from address $2^n+2^{n-1}$ to address $2^n+2^{n-1}+2^{n-2}-1$, and an address space assigned to the sort controller 22-1 is set to be a space from address $2^n+2^{n-1}+2^{n-2}$ to address $2^{n-1}+2^{n-2}+2^{n-3}-1$. At this time, each of the sort controllers has an independent area, a memory capacity twice the memory capacity for the last sort controller is enough as the total memory capacity, and the memory can be efficiently used.

The above assignment of the addresses can be easily realized such that the address converter 23 defines a start address of the external memory 24 for each of the sort controllers 22-1 through 22-n.

That is, the address converter 23 adds an address representing address 0 as a base address to a memory address issued from the sort controller 22-4, and the memory address from the sort controller 22-4 is used as an offset address from address 0. Similarly, the address converter 23 adds an address representing address $2^n$ as a base address to a memory address issued from the sort controller 22-3, and the memory address from the sort controller 22-3 is used as an offset address from address $2^n$. The address converter 23 adds an address representing address $2^n+2^{n-1}$ as a base address to a memory address issued from the sort controller 22-2, and the memory address from the sort controller 22-2 is used as an offset address from address $2^n+2^{n-1}$. The address converter 23 adds an address representing address $2^n+2^{n-1}+2^{n-2}$ as a base address to a memory address issued from the sort controller 22-1, and the memory address from the sort controller 22-1 is used as an offset address from address $2^n+2^{n-1}+2^{n-2}$.

A detailed arrangement of each of the sort controllers 22-1 through 22-n will be described below with reference to FIG. 4.

Figure 4:
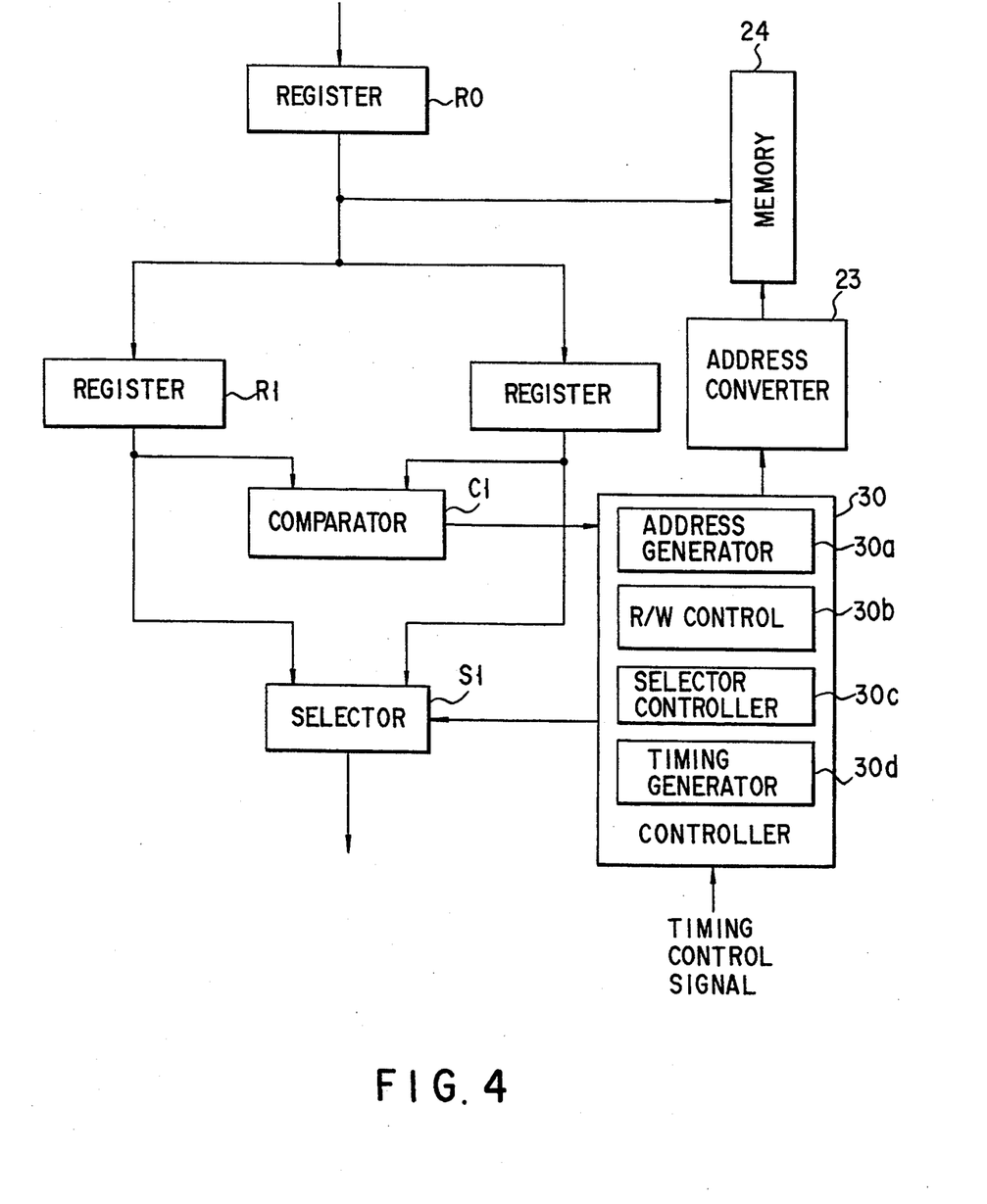
FIG. 4 is a block diagram showing a detailed arrangement of a sort controller of the embodiment.

As shown in FIG. 4, each sort controller consists of registers R0, R1, and R2, a comparator C1, a selector S1, and a controller 30. The register R0 is used as a buffer for writing input data in the memory 24. The register R1 stores one of two sets of data read out from the memory 24. The register R2 stores the other of two sets of data read out from the memory 24.

The comparator C1 compares a data value of the register R1 with a data value of the register R2 and informs the controller 30 of the comparison result. The selector S1 selectively outputs the data from the register R1 or R2 in accordance with an instruction from the controller 30. The controller 30 is used to control all the sort controllers and includes an address generator 30a for generating an address to the memory 24, a read/write controller 30b for generating a read/write signal to the memory 24, a selector controller 30c for controlling the selector S1 in accordance with the comparison result from the comparator C1, and a timing generator 30d for generating timing signals for operating all the sort controllers. A memory address from the address generator 30a is supplied to the memory 24 through the address converter 23. A selection signal from the selector controller 30c is supplied to a selector S1.

In controlling the selector S1, for example, when input data are to be sorted in an ascending order, data is read from one of the resistors R1 and R2 which stores a smaller value first. When input data are to be sorted in a descending order, data is read from one of the resistors R1 and R2 which stores a larger value first.

Generation timings of a memory address and a read/write signal from the controller 30 are controlled by an external timing control signal (FIG. 6) such that the read/write operation of the memory 24 is performed in an order of the sort controllers 22-1 through 22-n.

Figure 5:
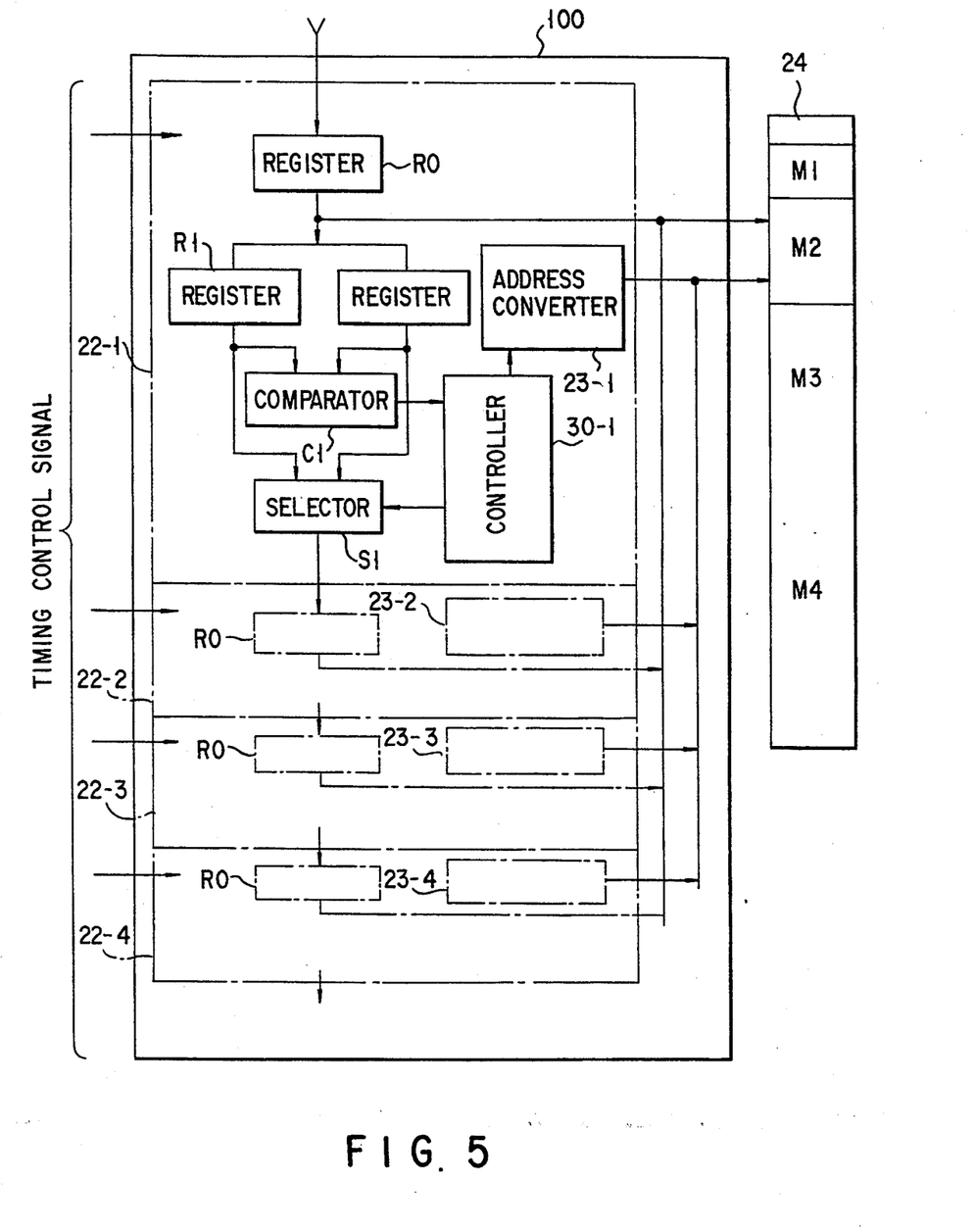
FIG. 5 is a block diagram showing a detailed arrangement when a plurality of sort controllers of the embodiment are integrated on one chip.

A case wherein the sort controllers 22-1 through 22-n are arranged as a one-chip LSI will be described below with reference to FIG. 5.

The address converting section 23 comprises a gate array based on the following logic algorithm.

```
M0   = MODE0
M1   = M0  + MODE1
M2   = M1  + MODE2
M3   = M2  + MODE3
  :
  :
  :
M18  = M17 + MODE18
AD0                                              ADR00:
AD1                                              ADR01:
AD2                                              ADR02:
AD3           MODE0    * LSEL + /M0   * ADR03:
AD4           MODE1    * LSEL + /M1   * ADR04:
AD5  = M0  + MODE2     * LSEL + /M2   * ADR05:
AD6  = M1  + MODE3     * LSEL + /M3   * ADR06:
AD7  = M2  + MODE4     * LSEL + /M4   * ADR07:
AD8  = M3  + MODE5     * LSEL + /M5   * ADR08:
AD9  = M4  + MODE6     * LSEL + /M6   * ADR09:
AD10 = M5  + MODE7     * LSEL + /M7   * ADR10:
AD11 = M6  + MODE8     * LSEL + /M8   * ADR11:
AD12 = M7  + MODE9     * LSEL + /M9   * ADR12:
AD13 = M8  + MODE10    * LSEL + /M10  * ADR13:
AD14 = M9  + MODE11    * LSEL + /M11  * ADR14:
AD15 = M10 + MODE12    * LSEL + /M12  * ADR15:
AD16 = M11 + MODE13    * LSEL + /M13  * ADR16:
AD17 = M12 + MODE14    * LSEL + /M14  * ADR17:
AD18 = M13 + MODE15    * LSEL + /M15  * ADR18:
AD19 = M14 + MODE16    * LSEL + /M16  * ADR19:
AD20 = M15 + MODE17    * LSEL + /M17  * ADR20:
AD21 = M16 + MODE18    * LSEL + /M18  * ADR21:
AD22 = M17 + MODE19    * LSEL:
AD23 = M18:
```

In the above logic algorithm, symbols "+", "*", and "/" denote OR gate, AND gate and NOT gate, respectively.

In this case, for the sake of descriptive simplicity, the four sort controllers 22-1 through 22-4 are integrated on a single semiconductor chip 100. Controllers 30-1 through 30-4 of the sort controllers 22-1 through 22-4 sequentially issue memory addresses to address converters 23-1 through 23-4 in response to an external timing control signal. Each of the address converters defines a start address of the external memory 24 for each of the sort controllers 22-1 through 22-4. Outputs from the address converters 23-1 through 23-4 are wired-ORed to be supplied to the memory 24. Outputs from the registers R0 of the sort controllers 22-1 through 22-4 are wired-ORed to be supplied to the memory 24. The sort controller 22-1 performs data input/output to/from a first memory area (M1) of the memory 24. Similarly, the sort controller 22-2 performs data input/output to/from a second memory area (M2) of the memory 24, the sort controller 22-3 performs data input/output to/from a third memory area (M3) of the memory 24, and the sort controller 22-4 performs data input/output to/from a fourth memory area (M4).

Figure 6:
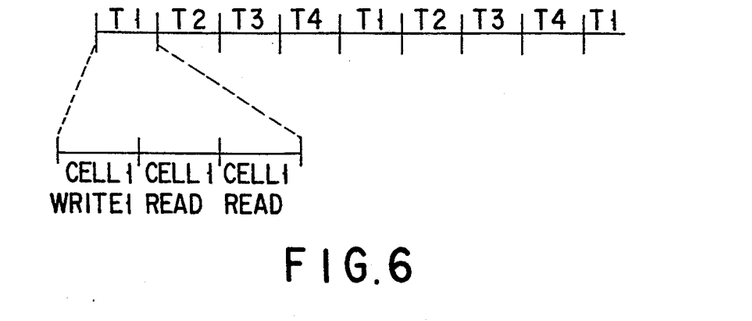
FIG. 6 is a view showing timings of memory access assigned to the sort controllers of the embodiment.

Access timings of the memory 24 assigned to the sort controllers 22-1 through 22-4 are shown in FIG. 6.

In FIG. 6, a time slot T1 represents a use timing of the memory bus 23 by the sort controller 22-1. Similarly, a time slot T2 represents a use timing of the memory bus by the sort controller 22-2, a time slot T3 represents a use timing of the memory bus by the sort controller 22-3, and a time slot T4 represents a use timing of the memory bus by the sort controller 22-4.

Each time slot is divided into one data writing period and two data reading periods. The data writing period is used to write data from the register R0 to memory 24, and the two data reading periods are used to read out data from the memory 24 to a register R1 and to read out data from the memory 24 to a register R2, respectively. According to the above arrangement, while the sort controller 22-2 performs arithmetic processing, the sort controller 22-1 receives data from the previous stage. In addition, since the sort controllers 22-3 and 22-4 are operated as described above, all the sort controllers are operated as a pipeline.

Figure 8:
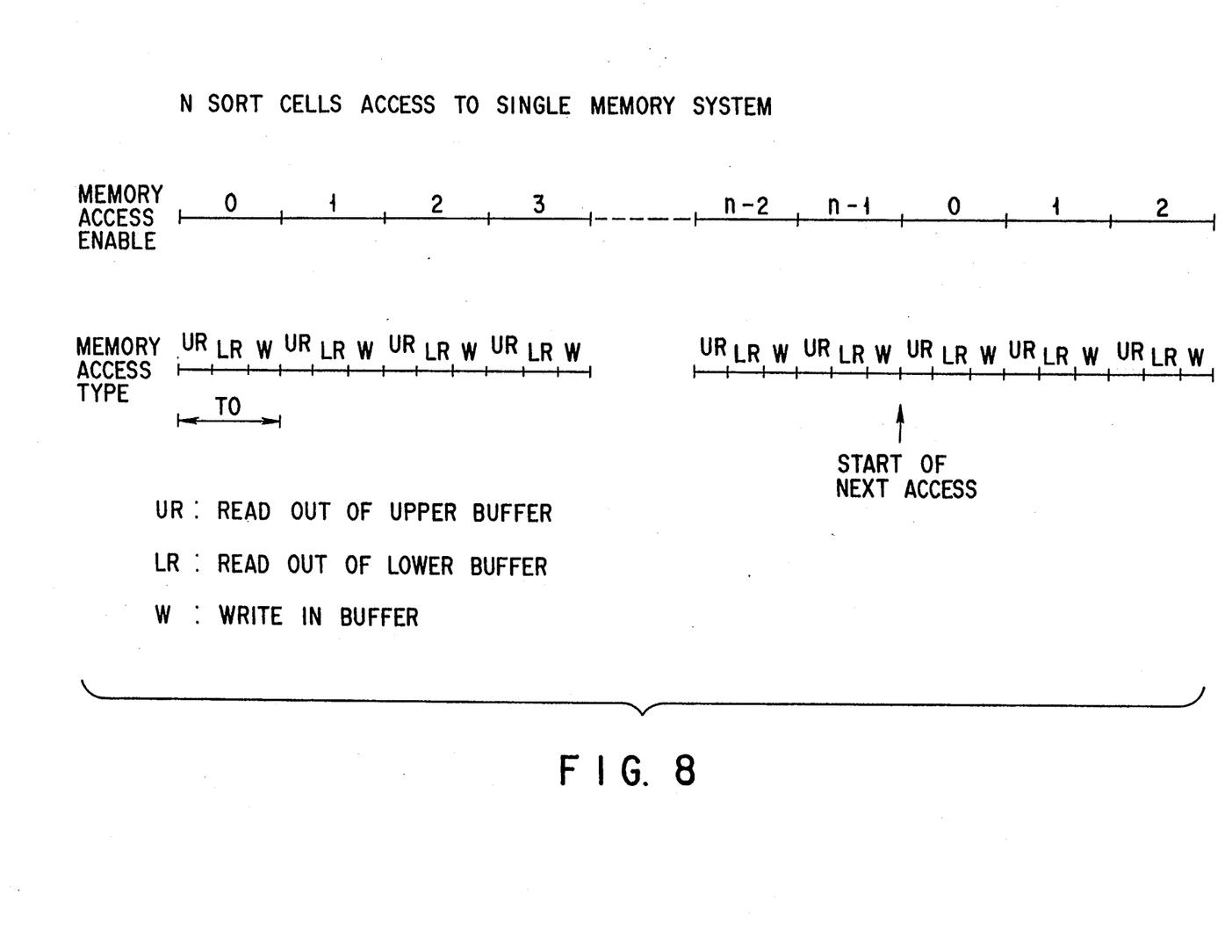
FIG. 8 illustrate a detailed timing diagram of FIG. 6.

FIG. 8 shows the details of the timing diagram when N sort cells access to a single memory system. During a period of T0, only the 0th sort cell accesses the memory. (No memory access occurs if it is not necessary.) Each sort cell uses a half of the buffer memory as the upper buffer and the remaining buffer as the lower buffer. Data set in the upper buffer is compared with the data set in the lower buffer. Although not shown, the upper buffer and the lower buffer are included in each sort cell.

Figure 7:
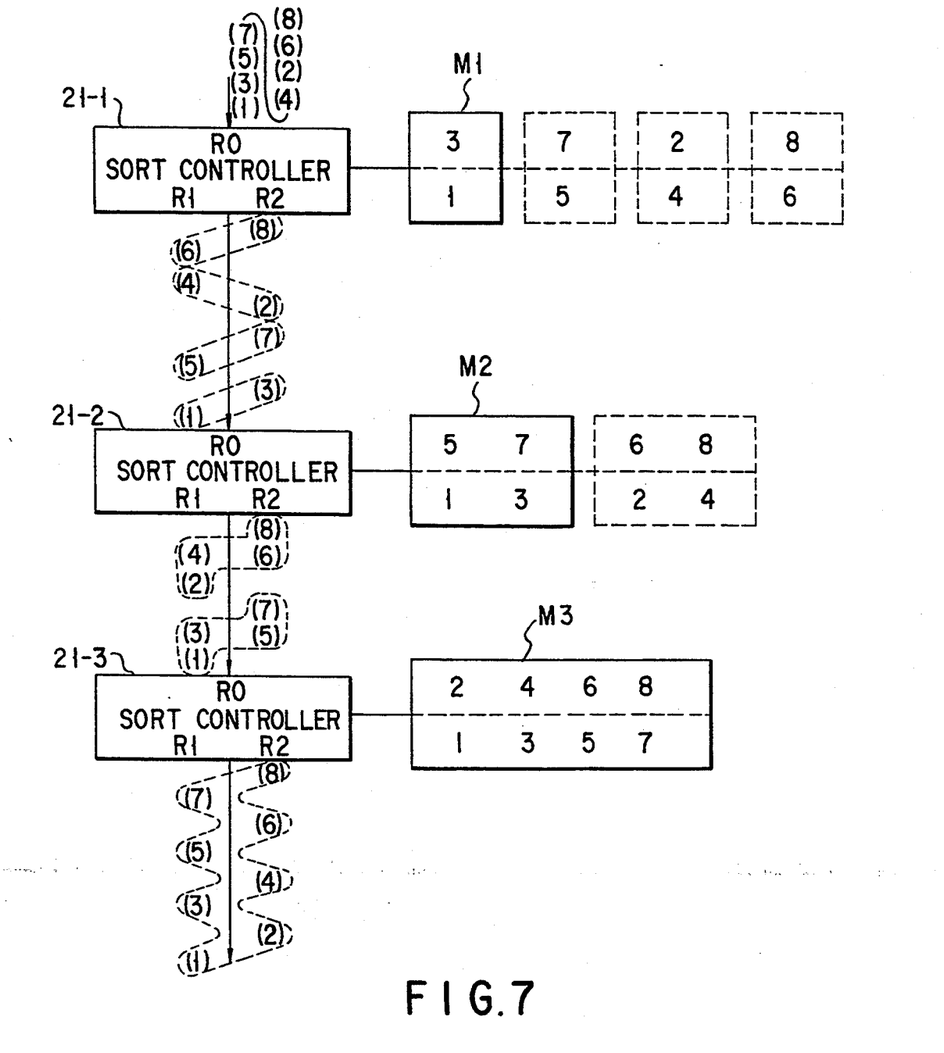
FIG. 7 is a view showing an operation of the embodiment.

A sort processing operation will be described below with reference to FIG. 7.

In this case, input data arranged in an order of "1", "3", "5", "7", "4", "2", "6", "8", . . . are sorted in an ascending order.

The sort controller 21-1 sequentially writes the input data in the memory area M1 from the start data, and the data are output to be arranged in an order of smaller values in units of two data. At this time, the data "1", "5", "4", and "6" are sequentially read to the register R1, and the data "3", "7", "2", and "8" are sequentially read to the register R2. The data of the register R1 is compared with the data of the register R2, and the smaller data is output first. As a result, the data "1" and "3", the data "5" and "7", the data "2" and "4", and the data "6" and "8" are output from the sort controller 21-1 as the first, second, third, and fourth sorted data sets, respectively.

The sort controller 21-2 sequentially writes data output from the sort controller 21-1 in the memory area M2 and outputs the data in units of four data to arrange the data in an order of smaller values. At this time, the first data set and the second data set are sequentially read to the register R1, and the first data set and the second data set are sequentially read to the register R2. In this case, the start data "1" of the first data set is compared with the start data "5" of the second data set, and the smaller data "1" is output. The data "3" is read to the register R1, the data "5" is compared with the data "3", and the smaller data "3" is output. In this manner, data having a larger value is left in the register, and comparison operations between two data are sequentially performed. As a result, the data "1", "3", "5", and "7" are output from the sort controller 21-2 as the first sorted data set, and the data "2", "4", "6", and "8" are output from the sort controller 21-2 as the second sorted data set.

The sort controller 21-3 sequentially writes data output from the sort controller 21-2 in the memory area M3 and outputs the data in units of eight data to arrange the data in an order of smaller data. At this time, the data of the first data set are sequentially read to the register R1, and the data of the second data set are sequentially read to the register R2. In this case, the start data "1" of the first data set is compared with the start data "2" of the second data set, and the smaller data "1" is output. The data "3" is read to the register R1, and the data "2" is compared with the data "3", and the smaller data "2" is output.

In this manner, data having a larger value is left in the register, and comparing operations between two data are sequentially performed. As a result, the data "1", "2", "3", "4", "5", "6", "7", and "8" are output from the sort controller 21-3 as the first sorted data set.

In this case, since the memory access operations by the sort controllers 21-1 through 21-3 are performed in the time slots T1 through T3, respectively, input data to be sorted are sequentially input to the sort controller 21-1. In addition, in a transient state in which the eight sorted data are sequentially being output from the sort controller 21-3, the sort controllers 21-1 through 21-3 are operated as a pipeline by one write operation from the register R0 to the memory and two read operations from the memory to the registers R1 and R2.

As described above, in this embodiment, since address spaces each having a memory capacity corresponding to an ordinal number of each of the plurality of sort controllers 22-1 through 22-n are assigned on the common external memory 24, no buffer memory is independently required for each sort cell. The use efficiency of the memory can be sufficiently increased.

In this embodiment, each of the plurality of sort controllers 22-1 through 22-n has an address converter, and each of the sort controllers issues a memory address including a base address. However, memory addresses from the plurality of sort controllers 22-1 through 22-n may be converted by one address converter 23.

In this embodiment, the memory bus is occupied by the plurality of sort controllers in the time slots. However, a bus arbitrator may be arranged to supply a bus permission signal to a specific sort controller in response to bus request signals from the plurality of sort controllers.

In addition, since the address converter 23 requires only one memory bus, the number of input/output pins for the memory bus is decreased, and the plurality of sort controllers 21-1 through 22-n can be integrated on one chip without increasing the number of input/output pins. This effect can also be obtained when the controller 30 of each of the sort controllers 22-1 through 22-n has an address converting function.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A sort processing apparatus in which $2^n$ data can be simultaneously processed comprising:
 a plurality of sort cells, connected in series, for performing a merge sort on two sets of input data, wherein each of said sort cells includes:
 a buffer memory for temporarily storing said two sets of input data;
 a sort executing unit for executing a sort on said two sets of data stored in said buffer memory; and
 a memory bus for connecting said sort executing unit to said buffer memory;
 an external memory, having an address space, connected to each of said sort cells; and
 address assigning means for dividing said address space of said external memory into memory areas and for assigning a memory capacity, which corresponds to an ordinal number of each of said sort cells, to each said memory area, and wherein said memory capacity of said nth sort cell includes addresses 0 to $2^n - 1$, an mth sort cell includes addresses $$\sum_{i=1}^{n-m} 2^{(n-i-1)} \text{ to } \left( \sum_{i=0}^{n-m} 2^{n-i} \right) - 1,$$

n is equal to a total number of said sort cells, and m = 1 to n − 1.

2. A sort processing apparatus comprising:
 a plurality of sort cells;
 sort processing means for serially connecting said sort cells and for performing a merge sort on two sets of input data so as to simultaneously perform sort processing of said two sets of input data;
 an external memory, having an address space, commonly used as a buffer memory by said sort cells; and address assigning means for dividing said address space of said external memory into memory areas and for assigning a memory capacity, which corresponds to an ordinal number of each of said sort cells, to each said memory area, wherein said memory capacity of said nth sort cell includes addresses 0 to $2^n-1$, wherein an mth sort cell includes addresses $$\sum_{i=1}^{n-m} 2^{(n-i-1)} \text{ to } \left(\sum_{i=0}^{n-m} 2^{n-i}\right) - 1,$$

and wherein m=1 to n−1.

3. An apparatus according to claim 2, wherein address outputs from said address assigning means are wired-ORed to one another.

4. An apparatus according to claim 2, wherein said sort processing means and said address assigning means are integrated on a semiconductor chip.

5. An apparatus according to claim 2, wherein each of said n sort cells includes a register for temporarily storing a processing result from a previous one of said sort cells.

6. An apparatus according to claim 5, wherein outputs from each said registers of said sort cells are wired-ORed to one another.

7. A sort processing apparatus in which $2^n$ data can be simultaneously processed comprising:
an external memory having an address space;
a plurality of sort cells, connected in series, for performing a merge sort on two sets of input data, wherein each of said sort cells includes:
 a buffer memory for temporarily storing said two sets of input data;
 a sort executing unit for executing a sort on said two sets of data stored in said buffer memory; and
 a memory bus for connecting said sort executing unit to said buffer memory;
address assigning means for dividing said address space of said external memory into memory areas and for assigning a memory capacity, which corresponds to an ordinal number of each of said sort cells, to each said memory area, wherein said memory capacity of said nth sort cell includes addresses 0 to $2^n-1$, wherein an mth sort cell includes addresses $$\sum_{i=1}^{n-m} 2^{(n-i-1)} \text{ to } \left(\sum_{i=0}^{n-m} 2^{n-i}\right) - 1,$$

and wherein m=1 to n−1;
means for commonly connecting said memory buses of said sort cells to one another and to said external memory; and
means for controlling access timings of said memory buses by said sort executing units.

8. An apparatus according to claim 7, wherein said plurality of sort executing units are integrated on a semiconductor chip.

9. A sort processing apparatus comprising:
a plurality of sort cells;
sort processing means for serially connecting said sort cells and for performing a merge sort on two sets of input data so as to simultaneously perform sort processing on said two sets of input data;
an external memory, having an address space, connected to each of said sort cells;
address assigning means for dividing said address space of said external memory into memory areas and for assigning a memory capacity, which corresponds to an ordinal number of each said sort cells, to each said memory area, wherein said memory capacity of said nth sort cell includes addresses 0 to $2^n-1$, wherein an mth sort cell includes addresses $$\sum_{i=1}^{n-m} 2^{(n-i-1)} \text{ to } \left(\sum_{i=0}^{n-m} 2^{n-i}\right) - 1,$$

and wherein m =1 to n−1;
common memory bus means for connecting each said sort cell to said external memory; and
means for controlling access timings of said common memory bus means.

10. An apparatus according to claim 9, wherein said plurality of sort cells are integrated on a semiconductor chip.

* * * * *